United States Patent [19]
Maikuma et al.

[11] Patent Number: 5,481,418
[45] Date of Patent: Jan. 2, 1996

[54] TAPE LOADING APARATUS INCLUDING GEAR MECHANISM FOR CONTROLLING ROTATION OF TAPE REELS

[75] Inventors: Masahiro Maikuma, Kanagawa; Tomoyasu Takaoka, Tokyo, both of Japan

[73] Assignee: Sony Corporation, Tokyo, Japan

[21] Appl. No.: 190,897

[22] Filed: Feb. 3, 1994

[30] Foreign Application Priority Data

Feb. 9, 1993 [JP] Japan ................... 5-020438

[51] Int. Cl.$^6$ .................... G11B 15/43; G11B 5/027
[52] U.S. Cl. .................... 360/85; 360/96.3; 242/356
[58] Field of Search .................... 360/85, 95, 96.3, 360/96.5; 242/199–201, 360, 338–338.1, 356–356.7

[56] References Cited

U.S. PATENT DOCUMENTS

| | | | |
|---|---|---|---|
| 4,292,557 | 9/1981 | Kishi | 310/78 |
| 4,492,994 | 1/1985 | Suda et al. | 360/85 |
| 4,907,110 | 3/1990 | Ando | 360/85 |
| 4,917,328 | 4/1990 | Kobayashi et al. | 242/204 |
| 5,070,422 | 12/1991 | Sasaki et al. | 360/96.3 |
| 5,153,790 | 10/1992 | Kobayashi et al. | 360/85 |
| 5,291,350 | 3/1994 | Hashiguchi et al. | 360/85 |
| 5,308,016 | 5/1994 | Saito et al. | 360/96.3 |

Primary Examiner—Stuart S. Levy
Assistant Examiner—Brian E. Miller
Attorney, Agent, or Firm—Jay H. Maioli

[57] ABSTRACT

A tape loading arrangement includes supply and take-up reel tables, a rotating magnetic head drum, a capstan motor, sliders including tape guides and a pendulum gear for engaging limiter gears associated with each of the reel tables. Magnetic torque limiters are provided at each of the reel tables and the torque ranges of each of the reel tables are set individually, the supply reel having a wider torque range than the take-up reel. According to this construction, the capstan motor generally controls the pendulum gear to engage the supply reel during a tape loading operation, wherein tape to be wound around the head drum is extracted from the take-up reel of the tape cassette. However, if the tape cassette is in a fully rewound state at which there is no tape available on the take-up reel, the capstan motor urges the pendulum gear to engage the limiter gear of the take-up reel table such that the tape may be extracted from the supply reel side and loading may be accomplished without delay no matter what the state of winding of the tape within the tape cassette.

16 Claims, 4 Drawing Sheets

TAPE LOADING APARATUS INCLUDING GEAR MECHANISM FOR CONTROLLING ROTATION OF TAPE REELS

BACKGROUND OF THE INVENTION

1. Field of the Invention

The present invention relates generally to a tape loading arrangement applicable to a rotating head type magnetic tape signal recording/reproducing apparatus, such as a video tape recorder (VTR).

2. Description of the Related Art

Various type of tape loading arrangements have been proposed for video tape recorders and other apparatus utilizing a rotatable head drum for reading from or writing to magnetic tape. According to such conventional arrangements, a brake lever or similar locking arrangement is provided at the supply reel side of the tape transport for stabilizing the supply reel during rewinding operations when magnetic tape is wound from the take-up reel side to the supply reel side of a tape cassette. One such conventional signal recording/reproducing apparatus utilizing magnetic tape is disclosed in European Patent Application Publication No. EP0390433A2. In such an arrangement as proposed, since the torque range of the supply reel is substantially wide, damage to the tape may occur when tape is being extracted from the supply reel during a tape loading operation. To counteract this tendency the supply reel may be locked and the tape extracted from a take-up reel having a smaller torque limit.

However, in a 'tape top' condition, that is, when the tape is completely rewound onto the supply reel, there is no tape available on the take-up reel to allow such take-up reel side tape loading as described above. In such a case, the take-up reel side loading is attempted a first time, then a tape top condition is detected by an optical sensor or the like and the tape within the cassette is wound for a predetermined time such that a sufficient length of tape is wound onto the take-up reel and the loading operation is repeated, thus the tape may always be loaded from the take-up reel side.

However, such a procedure as described above is time consuming and inconvenient for the user. Also, a complex mechanism must be provided for tape top detection, and thus the cost of the apparatus becomes high. Therefore, it has been required to provide a tape loading arrangement for a video tape recorder, or the like, in which tape loading may be quickly and reliably accomplished by a simple mechanism while tape damage is suitably prevented.

SUMMARY OF THE INVENTION

It is therefore a principal object of the present invention to overcome the drawbacks of the related art.

It is a further object of the present invention to provide a tape loading arrangement for a rotating head type signal recording/reproducing apparatus in which tape loading is accomplished quickly and reliably by a simple mechanism while damage to the magnetic tape is prevented.

In order to accomplish the aforementioned and other objects, a loading arrangement for an apparatus utilizing a rotatable head drum for reading or writing data to or from a length of magnetic tape which is wound between a supply reel and a take-up reel is provided, comprising: a supply reel table receiving a supply reel for winding the magnetic tape; a take-up reel table receiving a take-up reel for allowing the magnetic tape to be wound between the supply reel and the take-up reel; tape guide means for extracting a length of the magnetic tape from one of the supply or take-up reel and winding the magnetic tape around the rotatable head drum, the tape guide means being positioned between the supply reel table and the take-up reel table proximate the rotatable head drum along a traveling path of the magnetic tape; a motor for driving the supply and/or take up reels so as to move the magnetic tape; a capstan for receiving a driving force transmitted from the motor and being driven at a first constant speed; gear means for selectively linking the capstan with one of the supply or take-up reel tables; and control means controlling the loading arrangement such that, at a time of tape loading operation, the gear means is engaged with the supply reel table, preventing rotation of the supply reel, the tape guide means then being active to extract the length of the magnetic tape from the take-up reel and, during a tape rewinding operation of the apparatus, the control means being active to control the gear means to engage the take-up reel.

According to another aspect of the invention, an apparatus for reading and/or writing data to or from a magnetic tape is provided, comprising: circuit means for processing data read and/or write operations; a supply reel table receiving a supply reel for winding the magnetic tape; a take-up reel table receiving a take-up reel for allowing the magnetic tape to be wound between the supply reel and the take-up reel; combined means for reading a data signal from the magnetic tape and/or writing a data signal to the magnetic tape; tape guide means proximate the combined means and operatively associated therewith to extract a length of the magnetic tape from one of the supply or take-up reels and winding the magnetic tape around the combined means; a motor for driving the magnetic tape for winding the magnetic tape between the supply reel table and the take-up reel table via the tape guide means and the combined means; a capstan receiving a driving force transmitted from the motor and being driven at a first constant speed; gear means for selectively linking the capstan with one of the supply or take-up reel tables; and control means controlling the loading arrangement such that, at a time of the tape loading operation, the gear means is engaged with the supply reel table, preventing rotation of the supply reel, the tape guide means then extracting the length of the magnetic tape from the take-up reel and, during a tape rewinding operation of the apparatus, the control means being active to control the gear means to engage the take-up reel table.

DESCRIPTION OF THE PREFERRED EMBODIMENT

Figure 1:
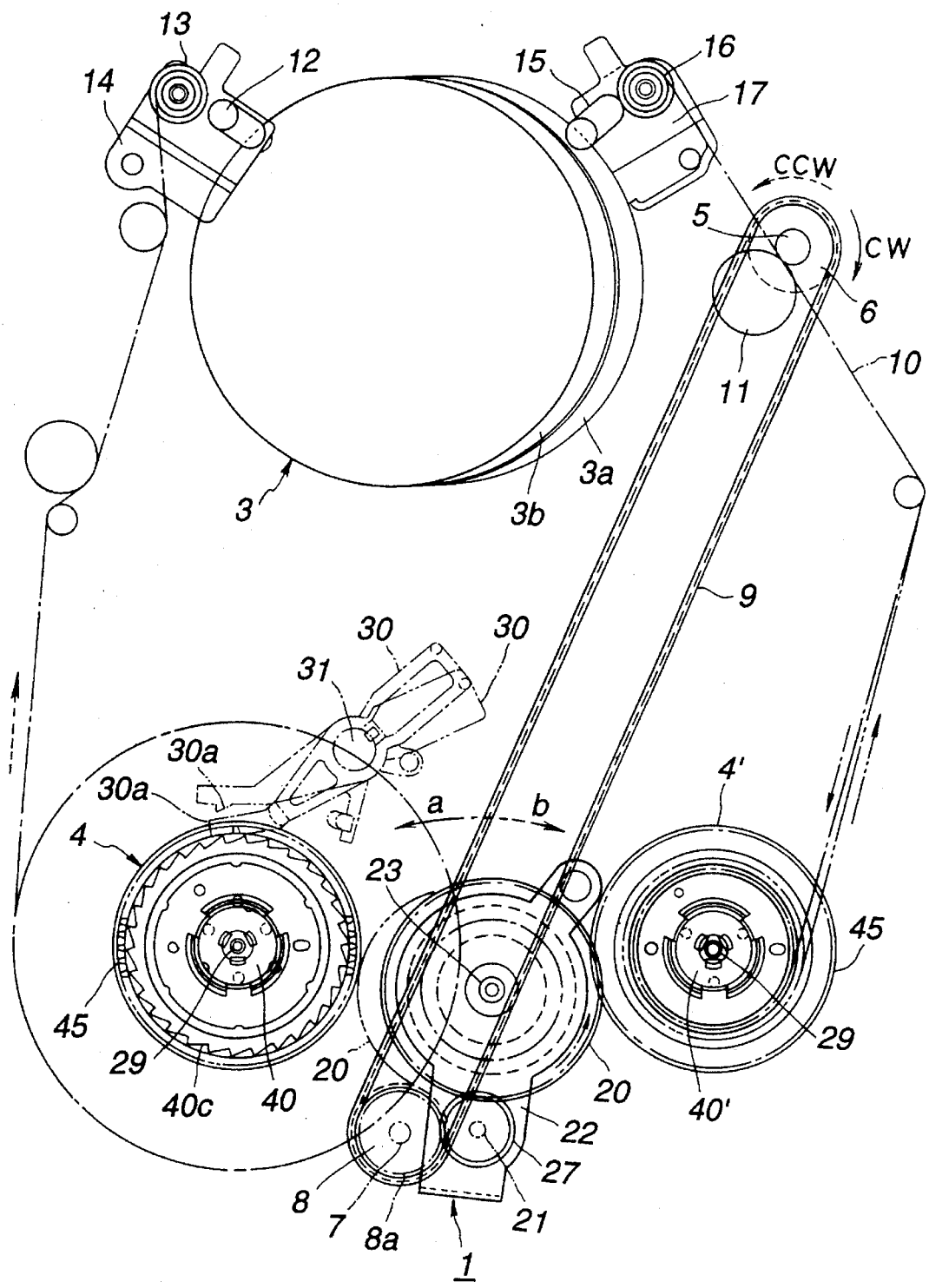
FIG. 1 is a simplified plan view of a VTR according to the preferred embodiment of the invention.

Referring now to the drawings, particularly to FIG. 1, a preferred embodiment of the invention will be described hereinbelow in detail. FIG. 1 shows a simplified plan view of an 8 millimeter type video tape recorder (magnetic tape type signal recording/reproducing apparatus) 1. The video tape recorder (hereinbelow: VTR) 1 receives a length of magnetic tape 10 wound between a supply reel table 4 and a take-up reel table 4'.

The VTR 1 further includes a chassis 2 (see FIG. 3) which rotatably mounts a head drum 3 to be driven by a motor (not shown). It will be noted that the head drum 3 includes a fixed (non-rotatable) base portion 3a and a rotatable upper portion 3b which is driven by the above-mentioned motor (not shown). The chassis 2 further supports the supply reel table 4 and the take up reel table 4', which are rotatably mounted on the chassis 2.

As will be described hereinafter in detail, the supply reel table 4 and the take-up reel table 4' include reel stands 40 and 40' respectively which are engageable with a capstan motor 5 via a timing belt 9 and a pendulum gear 20 which is swingable in left and right directions for selectively engaging either of the reel stands 40 or 40' for imparting driving force thereto. Further, as seen in FIG. 1, a pinch roller 11 is mounted so as to pressingly contact the capstan motor 5. Tape guides 12, 3, and 15, 16 as well as sliders 14 and 17 are provided for facilitating a tape loading operation as will be described in greater detail hereinbelow. Although not shown in the drawings, it will be noted that the sliders 14 and 17 are movably operable around the head drum 3 for effecting correct tape positioning during the loading operation.

Figure 2:
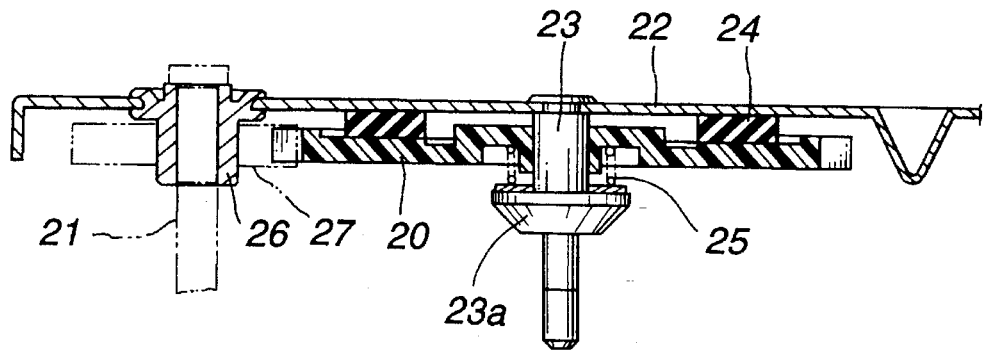
FIG. 2 is a cross-sectional view of a relationship between gears of the VTR of FIG. 1.

The timing belt 9 is arranged between pulleys 6 and 8, the pulley 6 being supported on the capstan motor 5 and the pulley 8 being rotatably supported on an axial shaft 7 projected from the chassis 2. Also, as seen in FIGS. 1 and 2, adjacent the axial shaft 7, a second axial shaft 21 is projected from the chassis 2. The second axial shaft 21 supports a gear 27 and a swing plate 22 which is formed of stamped metal, or the like. At a substantially center portion of the swing plate 22 an axial shaft 23 is provided for rotatably mounting the pendulum gear 20 at a lower side of the swing plate 22.

As seen in FIG. 2, between the pendulum gear 20 and the swing plate 22, a circular felt mat 24 is disposed and, a compressed coil spring 25 is provided between a flanged portion 23a of the axial shaft 23 and the pendulum gear 20 for biasing the pendulum gear 20 in the direction of the felt mat 24 for dissipating excess torque which may be present during a loading operation. At this, depending on the rotational direction of the capstan motor 5, the pendulum gear 20 is driven to swing toward either the supply reel table 4 or the take-up reel table 4', gear teeth of the pendulum gear thereby coming into engagement with gear teeth provided at the reel tables 4 or 4'. In addition, the axial shaft 21 which mounts the swing plate 22, further mounts the gear 27 via a collar portion 26. The gear 27 is disposed such that gear teeth thereof engage gear teeth 8a provided on an outer circumference of the pulley 8.

Mounted on the chassis 2 via an axial shaft 31 a brake lever 30 is provided proximate the supply reel table 4 for braking, or preventing rotation of the supply reel table 4 during a tape unloading operation. Owing to a one-way cam arrangement (not shown) an engaging end 30a of the brake lever 30 is driven to engage gear teeth 45c of a limiter gear 45 during tape unloading and to be separated from the gear teeth 45c of the limiter gear 45 during tape loading operation (positions shown in dotted lines in FIG. 1).

Figure 3:
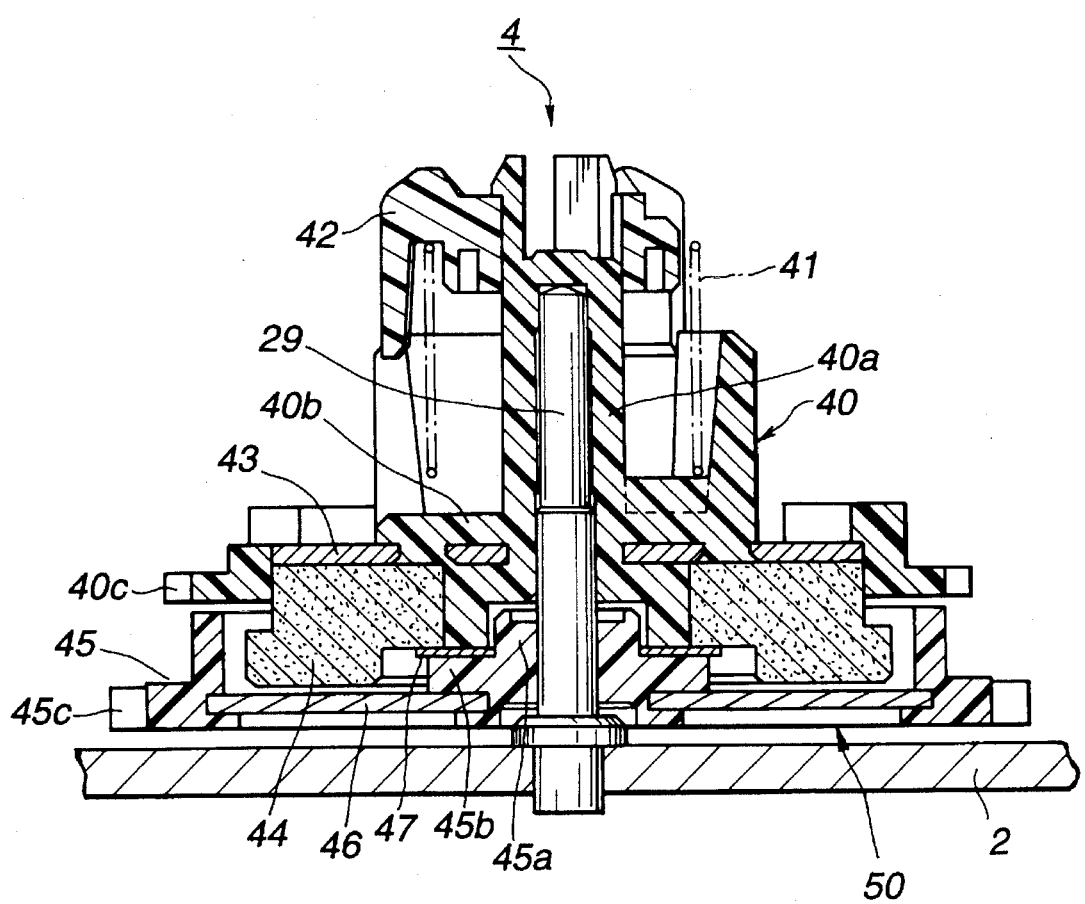
FIG. 3 is a cross-sectional view of a supply reel table of the VTR of FIG. 1.
Figure 5:
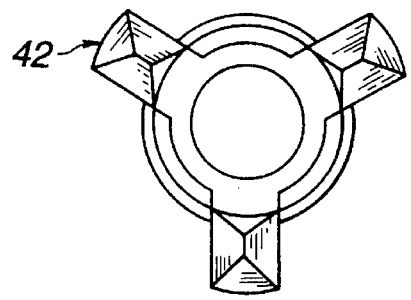
FIG. 5 is a plan view of a reel hook of the supply reel table of FIGS. 3 and 4.

Referring now to FIG. 3, the supply reel table 4 is mounted on an axial shaft 29 mounted on the chassis 2. The axial shaft 29 is covered by a cylindrical cover portion 40a of the reel stand 40 for rotatably mounting the supply reel table 4. A reel hook 42 (see also FIG. 5) inserted into the top side of the cover portion 40a mounts a coil spring 41 at a lower side thereof so as to apply pressure for always biasing the reel stand 40 in the downward direction. Also, at a lower side of the cover portion 40a a circular plate portion 40b is formed which is supported on a yoke plate 43 adhered at a lower side thereof on a so-called 'plastic magnet' portion 44. At the base of the axial shaft 29 a collar portion 45a is provided for rotatably mounting the limiter gear 45 via a circular magnetic support plate 46 which may be formed integrally therewith. A thrust washer 47 is interposed between the upper side of the collar portion 45a and the lower side of the plastic magnet 44. It will be noted that the thrust washer 47 comprises a circular ring of an antimagnetic material such that the reel stand 40 and the limiter gear 45 may rotate freely with substantially low friction.

Figure 4:
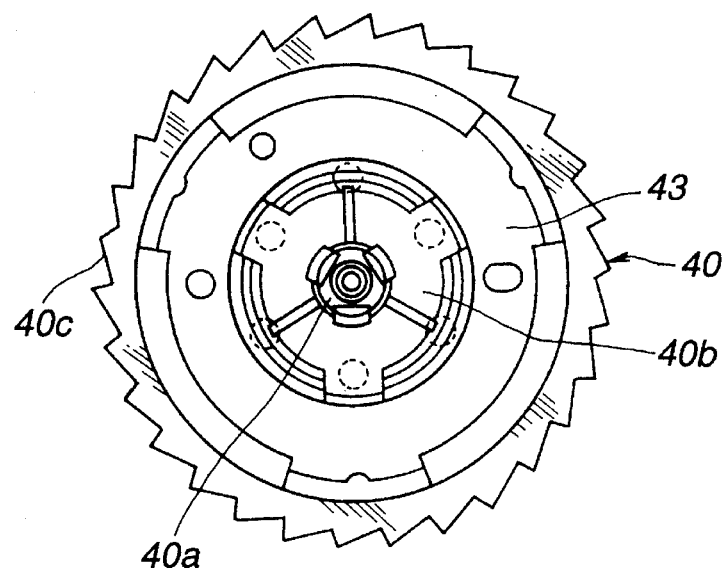
FIG. 4 is a plan view of the supply reel table of FIG. 3.

As may be seen in FIG. 4, the outer circumference of the limiter gear 45 is provided with gear teeth 45c, which may be integrally formed with the limiter gear, of synthetic resin, or the like.

The above-described yoke plate 43, the plastic magnet 44, the magnetic plate 46 and the thrust washer 47 collectively comprise a torque limiting mechanism 50, as seen in FIG. 3. Thereby torque loss arising from relative rotation of the magnetic plate 46 of the limiter gear 45 and the plastic magnet 44 of the reel stand 40 is regulated. Further, to resist friction reduction of the plastic magnet 44, a predetermined clearance is set between the plastic magnet 44 and the magnetic plate 46.

Figure 6:
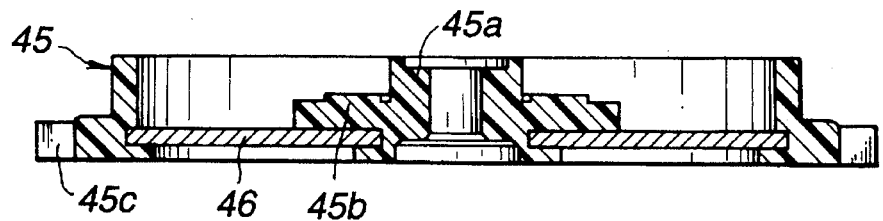
FIG. 6 is a cross-sectional view of a limiter gear off the supply reel table of FIG. 3.

As seen in FIG. 6 the collar portion 45a of the limiter gear 45 includes a flat surface portion 45b on which the thrust washer 47 is disposed so as to be positioned between the limiter gear 45 and the plastic magnet 44 and the yoke plate 43 (FIG. 3). According to this construction, the preset clearance may always be reliably maintained. Also, the magnetic field generated between the plastic magnet 44 and the magnetic plate 46 of the limiter gear 45 assure that the assembly rotates freely and easily around the axial shaft 29. Also, according to the present embodiment the above-described torque limiting mechanism 50 is active to limit torque in the range of about 2 mN·m–3 mN·m (approximately 20 g·cm–30 g·cm).

Figure 7:
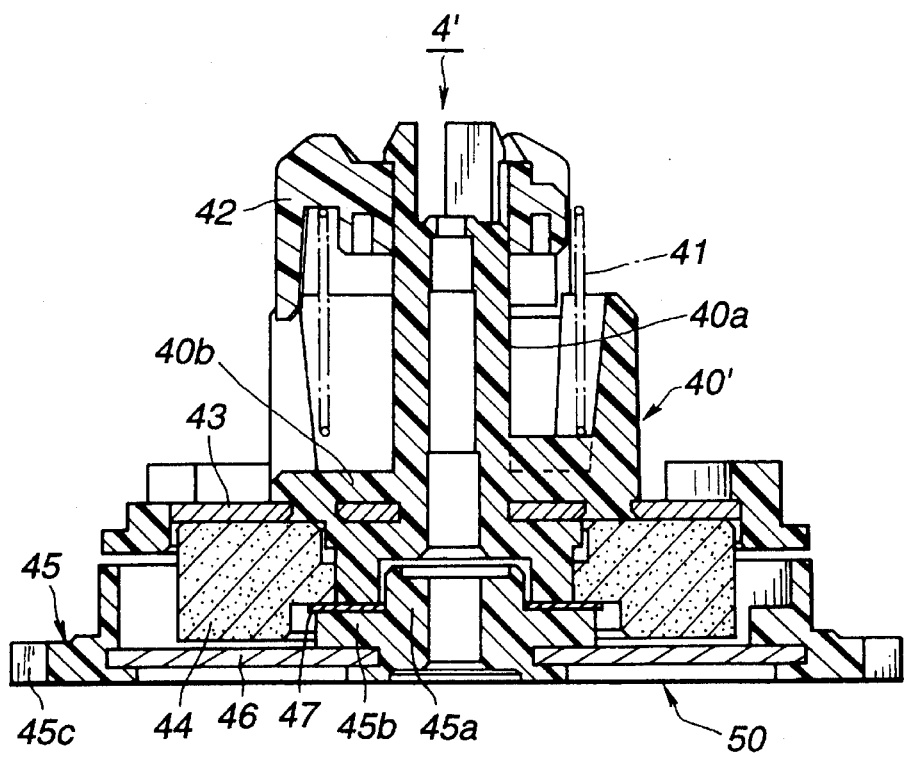
FIG. 7 is a cross-sectional view of a take-up reel table of the VTR of FIG. 1.
Figure 8:
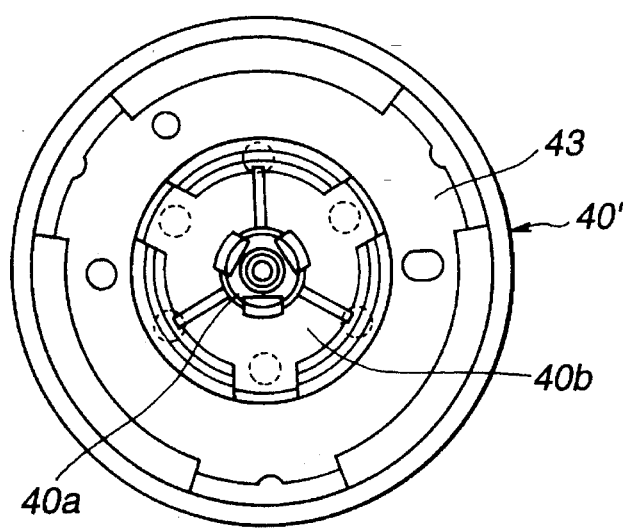
FIG. 8 is a plan view of the take-up reel table of FIG. 7.

Referring now to FIGS. 7 and 8, the structure of the take-up reel table 4' according to the invention will be explained hereinbelow in detail. As seen in FIG. 7, the take-up reel table 4' comprises a take-up reel stand 40', housing a plastic magnet 49 which, according to the present embodiment, is of a magnetic strength which is weaker than the magnetic strength of the plastic magnet 44 of the supply reel table 4. In other respects, the construction of the take-up reel table 4' is the same as that of the supply reel table 4, accordingly, like parts will be referred to by the same reference numbers for clarity. Also, the torque limiting mechanism 50 of the take-up reel table 4' is set to establish torque limitation at substantially 1 mN·m (approximately 10 g·cm). Thus, the torque range of the supply reel table 4 is substantially larger than that of the take-up reel table 4'.

Hereinbelow the tape loading operation of the VTR 1 according to the invention will be explained in detail with reference to FIG. 1.

First, when a tape cassette (not shown) containing the magnetic tape 10 is lowered onto the reel tables 4 and 4' by a cassette holder (not shown) for allowing the magnetic tape to be wound around the rotatable head drum 3, the supply reel table 4, the take-up reel table 4', the pendulum gear 20 etc., assume an initial position as shown by a two-dot line in FIG. 1, such that the gear teeth 45c of the limiter gear of the supply reel table 4 are engaged with the pendulum gear so as to stop the supply reel table 4 from moving.

Then, the sliders 14 and 17 mounting the tape guides 12, 13 and 15, 16 move around the rotatable head drum 3 so as to position the magnetic tape 10 in a position for use. At this time, the pendulum gear 20 is engaged with the limiter gear 45 of the supply reel table 4 and tape is drawn from the take-up reel table 4' side of the tape cassette (not shown) in the direction shown by the two-dot arrow in FIG. 1.

Further, in a condition where there is no tape left on the take-up reel side of the tape cassette, such as when the tape cassette has been rewound to the very beginning, the loading arrangement according to the invention operates such that the capstan motor 5 rotates in the counterclockwise direction CCW causing the pendulum gear 20 to swing so as to engage the gear teeth 45c of the limiter gear 45 of the take-up reel table 4'. In this condition, the take-up reel is rotated and the tape for winding around the rotatable head drum 3 is quickly and easily extracted from the supply reel side of the tape cassette (not shown) in the direction shown by the dashed line arrow of FIG. 1. Thus loading operation is quickly accomplished no matter what the state of the tape winding within the tape cassette.

Furthermore, during rewinding of a tape cassette, when the magnetic tape 10 is wound from the take-up reel to the supply reel thereof, the capstan motor rotates in the counterclockwise direction CCW to move the pendulum gear 20 so as to engage the gear teeth 45c of the limiter gear 45 of the take-up reel table 4'. At this, the tape is wound in the direction shown by the single-dot arrow of FIG. 1. Further, at this time the end portion 30a of the brake lever 30 engages the limiter gear 45 of the supply reel table 4 to prevent extraction of excess tape from the supply reel side of the tape cassette, which may cause slack to form in the magnetic tape, or cause tape damage.

Also, in a condition where condensation (dew) is present at the magnetic tape wound around the rotatable head drum 3, capstan motor 5 is driven in the clockwise direction CW to move pendulum gear 20 so as to engage the gear teeth 45c of the limiter gear 45 of the supply reel table 4. At this time, magnetic tape is wound in the direction of the supply reel side of the tape cassette (not shown) while the rotatable upper portion 3b of the rotatable head drum is driven to rotate in the counterclockwise direction. According to this operation, in a case where the condensation is light, the condensation problem is thus easily remedied and normal operation can be swiftly resumed. In a case where condensation is heavy and normal operation cannot be immediately resumed, abnormal rotation of the rotatable upper portion 3b of the head drum 3, or the presence of heavy condensation at the head drum 3 is suitably detected.

It will be noted that, although the above embodiment discloses a magnetic torque limiter mechanism for the reel tables 4 and 4', torque limitation effected by a felt mat or the like may also preferably be used. Further, although the above embodiment is described in terms of an 8 mm video tape recorder, the invention is equally applicable to VHS, DAT, or any other tape format and to any other type of device utilizing tape which is to be wound between supply and take-up reels.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A tape loading apparatus having a rotatable head drum for one of reading data from and writing data to a length of a tape which is wound between a supply reel and a take-up reel, comprising:

a base plate;

a supply reel table mounted on said base plate supporting said supply reel around which said tape is wound;

a take-up reel table mounted on said base plate supporting said take-up reel around which said tape is wound such that said tape extends between said supply reel and said take-up reel;

tape guide means for extracting said tape from one of said supply reel and said take-up reel and for winding said tape around said rotatable head drum, said tape guide means being positioned between said supply reel table and said take-up reel table proximate said rotatable head drum along a traveling path of said tape;

a motor for driving one of said supply reel and said take up reel so as to transport said tape;

a capstan receiving a driving force transmitted from said motor and being driven at a first constant speed;

a swing plate pivotally mounted on said base plate between said supply reel table and said take-up reel table and connected to said capstan;

a pendulum gear rotatably mounted on said swing plate and engageable with one of said supply reel and said take-up reel for linking said capstan with one of said supply reel table and said take-up reel table; and control means connected to said motor for controlling a loading arrangement in response to a rotation of said motor such that, during a tape loading operation, said pendulum gear is engaged with said supply reel table, thereby preventing a rotation of said supply reel, said tape guide means then extracting said length of said tape from said take-up reel and, during a tape rewinding operation of said apparatus, said control means shifts said pendulum gear so as to engage said pendulum gear with said take-up reel table thereby rotating said take-up reel.

2. A tape loading apparatus as set forth in claim 1, wherein, during a tape loading operation when there is no tape wound around said take-up reel, said control means controls said pendulum gear so as to engage said pendulum gear with said take-up reel to rotate said take-up reel while said tape guide means extracts said length of said tape from said supply reel.

3. A tape loading apparatus as set forth in claim 2, further comprising torque limiting means provided on said supply reel table and said take-up reel table, a torque range of said supply reel being set to be larger than a torque range of said take-up reel.

4. A tape loading apparatus as set forth in claim 3, wherein said swing plate is pivotally mounted on said base plate in a set position and is swingable between a first position whereat said pendulum gear engages said supply reel table and a second position whereat said pendulum gear engages said take-up reel table according to a rotational direction of said capstan.

5. A tape loading apparatus as set forth in claim 4, wherein each of said supply reel table and said take-up reel table further comprises a limiter gear provided with gear teeth engageable with gear teeth of said pendulum gear for receiving the driving force transmitted from said motor.

6. A tape loading apparatus as set forth in claim 5, wherein the driving force is transmitted between said capstan and said pendulum gear through a belt.

7. A tape loading apparatus as set forth in claim 6, further comprising a gear wheel mounted on said base plate and engaged by said belt, said gear wheel transmitting the driving force to said pendulum gear from said capstan to drive said pendulum gear.

8. A tape loading apparatus as set forth in claim 7, further comprising a brake lever provided proximate said supply reel table, said brake lever engaging said supply reel table for braking a rotation of said supply reel table during the tape rewinding operation of said loading arrangement and disengaging said supply reel table during a play or a record mode of operation of said apparatus, said brake lever being pivotally mounted on said base plate such that an end thereof is engageable with said gear teeth provided on said limiter gear of said supply reel table.

9. An information signal recording and/or reproducing apparatus, comprising:

circuit means for processing one of data read and data write operations;

a base plate;

a supply reel table mounted on said base plate supporting a supply reel around which a tape is wound;

a take-up reel table mounted on said base plate supporting a take-up reel around which said tape is wound such that the tape extends between said supply reel and said take-up reel;

a head drum for one of reading a data signal from said tape and writing a data signal to said tape;

tape guide means proximate said head drum and operatively associated therewith to extract a length of said tape from one of said supply reel and said take-up reel and winding said tape around said head drum;

a motor driving said tape for winding said tape between said supply reel table and said take-up reel table through said tape guide means and said head drum;

a capstan receiving a driving force transmitted from said motor and being driven at a first constant speed;

a swing plate pivotally mounted on said base plate between said supply reel table and said take-up reel table and connected to said capstan;

a pendulum gear rotatably mounted on said swing plate and engageable with one of said supply reel and said take-up reel for linking said capstan with one of said supply reel table and said take-up reel table; and control means connected to said motor for controlling a loading arrangement in response to a rotation of said motor such that, during a tape loading operation, said pendulum gear is engaged with said supply reel table, thereby preventing rotation of said supply reel, said tape guide means then extracting said tape from said take-up reel and, during a tape rewinding operation of the apparatus, said control means controls said pendulum gear so as to engage said pendulum gear with said take-up reel table thereby rotating said take-up reel.

10. An apparatus as set forth in claim 9, wherein, during a tape loading operation when there is no tape wound around said take-up reel, said control means controls said pendulum gear so as to engage said pendulum gear with said take-up reel to rotate said take-up reel while said tape guide means extracts said length of said tape from said supply reel.

11. An apparatus as set forth in claim 10, further comprising torque limiting means provided on said supply reel table and said take-up reel table, a torque range of said supply reel being set to be larger than a torque range of said take-up reel.

12. An apparatus as set forth in claim 11, wherein said swing plate is pivotally mounted on said base plate in a set position and is swingable between a first position whereat said pendulum gear engages said supply reel table and a second position whereat said pendulum gear engages said take-up reel table according to a rotational direction of said capstan.

13. An apparatus as set forth in claim 12, wherein each of said supply reel table and said take-up reel table further comprises a limiter gear provided with gear teeth engageable with gear teeth of said pendulum gear for receiving the driving force transmitted from said motor.

14. An apparatus as set forth in claim 13, wherein the driving force is transmitted between said capstan and said pendulum gear through a belt.

15. An apparatus as set forth in claim 14, further comprising a gear wheel mounted on said base plate and engaged by said belt, said gear wheel transmitting the driving force to said pendulum gear from said capstan to drive said pendulum gear.

16. An apparatus as set forth in claim 15, further comprising a brake lever provided proximate said supply reel table, said brake lever engaging said supply reel table for braking a rotation of said supply reel table during the tape rewinding operation of said loading arrangement and disengaging said supply reel table during a play or a record mode of operation of said apparatus, said brake lever being pivotally mounted on said base plate such that an end thereof is engageable with said gear teeth provided on said limiter gear of said supply reel table.

* * * * *